(12) United States Patent
Kim et al.

(10) Patent No.: US 7,092,063 B2
(45) Date of Patent: Aug. 15, 2006

(54) METHOD FOR DESIGNING MASK AND FABRICATING PANEL

(75) Inventors: Jeong Rok Kim, Kumi-shi (KR); Kyung Kyu Kang, Jinju-shi (KR); Jo Hann Jeong, Kumi-shi (KR); Myung Woo Nam, Kyongsangbuk-do (KR); Jae Deuk Shin, Pusan-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 411 days.

(21) Appl. No.: 10/602,672

(22) Filed: Jun. 25, 2003

(65) Prior Publication Data

US 2004/0100593 A1 May 27, 2004

(30) Foreign Application Priority Data

Oct. 19, 2002 (KR) .................. 10-2002-0064061

(51) Int. Cl.
*G02F 1/13* (2006.01)

(52) U.S. Cl. ........................................ 349/153; 349/190
(58) Field of Classification Search ................ 349/153, 349/190
See application file for complete search history.

(56) References Cited

U.S. PATENT DOCUMENTS

| 6,066,018 | A | * | 5/2000 | Grupp et al. ................. 445/25 |
| 6,099,672 | A | * | 8/2000 | Yamazaki et al. .......... 156/109 |
| 6,137,559 | A | * | 10/2000 | Tanaka et al. ............... 349/153 |
| 6,542,215 | B1 | * | 4/2003 | Lee et al. .................... 349/153 |
| 6,573,968 | B1 | * | 6/2003 | Jeong ......................... 349/153 |
| 6,573,972 | B1 | * | 6/2003 | Sasaki ........................ 349/190 |
| 6,628,365 | B1 | * | 9/2003 | Park et al. ................... 349/153 |
| 6,741,316 | B1 | * | 5/2004 | Park et al. ................... 349/153 |
| 2001/0012088 | A1 | * | 8/2001 | Jeong ......................... 349/153 |
| 2003/0038914 | A1 | * | 2/2003 | Kim et al. ................... 349/153 |
| 2003/0169392 | A1 | * | 9/2003 | Park et al. ................... 349/153 |
| 2003/0179337 | A1 | * | 9/2003 | Park et al. ................... 349/153 |
| 2004/0057006 | A1 | * | 3/2004 | Park et al. ................... 349/153 |

* cited by examiner

*Primary Examiner*—James A. Dudek
(74) *Attorney, Agent, or Firm*—McKenna Long & Aldridge LLP

(57) ABSTRACT

A method for designing a mask and for fabricating a panel improves the efficiency with which a base substrate may be used by forming unit panels of different sizes on the base substrate. The mask includes a first region and a second region, a first mask pattern within the first region, and a second mask pattern within the second region.

68 Claims, 12 Drawing Sheets

METHOD FOR DESIGNING MASK AND FABRICATING PANEL

This application claims the benefit of the Korean Application No. P2002-64061 filed on Oct. 19, 2002, which is hereby incorporated by reference which is hereby incorporated by reference for all purposes as if fully set forth herein. This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to liquid crystal display (LCD) devices, and more particularly to a method of designing a mask and of fabricating a unit panel while maximizing an efficiency with which a base substrate is used.

2. Discussion of the Related Art

Recent developments within the information communication field have increased demands for various types of display devices. In response to this demand, flat panel displays such as liquid crystal display devices (LCDs), plasma display panels (PDPs), electro luminescent display (ELDs), and vacuum fluorescent display (VFDs) have been developed and use as displays of various products.

Due to their excellent picture quality, light weight, thin profile, and low power consumption, LCDs are used as televisions, capable of receiving and displaying broadcast signals, replacing cathode ray tubes (CRTs), and are widely used in portable displays such as monitors of laptop and notebook computers, video cameras, and the like, that require displays of different sizes.

Despite various technical developments in LCD technology, however, research in enhancing picture quality of LCD devices has been lacking compared to research in other features and advantages of LCD devices. Therefore, to increase the use of LCD devices as displays in various fields of application, LCD devices capable of expressing high quality images (e.g., images having a high resolution and a high luminance) with large-sized screens, while still maintaining a light weight, minimal dimensions, and low power consumption must be developed.

LCDs generally include a LCD panel for displaying a picture and a driving part for providing driving signals to the liquid crystal display panel. The LCD panel generally includes first and second glass substrates bonded to each other and spaced apart from each other by a cell gap. A layer of liquid crystal material is injected into the gap between the first and second glass substrates.

The first glass substrate (i.e., thin film transistor (TFT) array substrate), supports a plurality of gate lines spaced apart from each other at a fixed interval and extending along a first direction; a plurality of data lines spaced apart from each other at a fixed interval and extending along a second direction, substantially perpendicular to the first direction, wherein pixel regions are defined by crossings of the gate and data lines; a plurality of pixel electrodes arranged in a matrix pattern within respective ones of the pixel regions; and a plurality of thin film transistors (TFTs) capable of transmitting signal from the data lines to corresponding ones of the pixel electrodes in response to a signal applied to respective ones of the gate lines.

The second glass substrate (i.e., color filter substrate) supports a black matrix layer for preventing light leakage in areas outside the pixel regions; a color filter layer (R, G, B) for selectively transmitting light having predetermined wavelengths; and a common electrode for implementing a picture. In in-plane switching mode LCD devices, the common electrode is formed on the first substrate.

Uniformity of the cell gap is maintained by spacers arranged between the first and second glass substrates, bonded together by a sealant. The sealant includes a liquid crystal injection inlet allowing liquid crystal material to be injected into the cell gap.

FIG. 1 illustrates a perspective view of a related art LCD panel in a color LCD device.

Referring to FIG. 1, the related art LCD panel includes lower and upper substrates 1 and 2, respectively, that may be bonded together. A layer of liquid crystal material 3 is then injected between the bonded lower and upper substrates 1 and 2.

The lower substrate 1 (i.e., the TFT array substrate) supports a plurality of gate lines 4 spaced apart from each other and extending along a first direction and a plurality of data lines 5 spaced apart from each other and extending along a second direction, substantially perpendicular to the first direction. Pixel regions P are defined by crossings of the gate and data lines 4 and 5, respectively. A plurality of pixel electrodes 6 are arranged in a matrix pattern within respective ones of the pixel regions P and thin film transistors T are formed at crossings of the plurality of gate and data lines 4 and 5, respectively.

The upper substrate (i.e., the color filter array substrate) supports a black matrix layer 7 for preventing light leakage in areas outside the pixel regions P; a color filter layer (R, G, B) 8 for selectively transmitting light having predetermined wavelengths; and a common electrode 9 for implementing a picture.

Each of the thin film transistors T includes a gate electrode protruding from a corresponding gate line 4, a gate insulating layer (not shown) formed over an entire surface of the lower substrate, an active layer formed on the gate insulating layer in a region above the gate electrode, a source electrode protruding from a corresponding data line 5, and a drain electrode formed opposite the source electrode. The pixel electrode 6 is formed of a transparent conductive metal having good light transmittance characteristics such as indium-tin-oxide (ITO).

Still referring to FIG. 1, an orientation of molecules within the layer of liquid crystal material 3, provided between the lower and upper substrates 1 and 2, is adjusted by a signal output by the thin film transistor T. For example, a vertically oriented electric field, generated within the layer of liquid crystal material as a result of the signal output by the thin film transistor T, adjusts the orientation of molecules within the layer of liquid crystal material. When the orientation of the liquid crystal molecules is adjusted, the light transmittance characteristics of the layer of liquid crystal material 3 are affected. Accordingly, the signal output by the thin film transistor T enables the light transmittance characteristics of the layer of liquid crystal 3 to be controlled while providing a pixel region P having a high aperture ratio. The common electrode 9 of the upper substrate 2 is grounded, to prevent the pixel regions P from being electrically damaged.

A method for fabricating the related art LCD panel shown in FIG. 1 will now be explained in greater detail with reference to FIG. 2.

Referring to FIG. 2, a plurality of the aforementioned TFT array substrates or color filter array substrates, both herein referred to as unit panels 12 are formed within a base substrate 11, wherein each unit panel 12 is of the same size. Each unit panel 12 includes an active region 13, a black matrix region 14, and a pad region 15. Unit panels 12 provided as TFT array substrates are fabricated via a plurality of thin film deposition and photolithography steps that incorporate the use of masks. After the unit panels 12 are formed, an inspection is performed to evaluate the quality of the unit panels 12, wherein the unit panel 12 may be used in an LCD panel if the unit panel 12 is of a predetermined quality.

After the unit panels 12 (e.g., TFT array substrates and color filter substrates) are formed within their respective base substrates 11, a polyimide alignment layer is printed onto a surface of the base substrates 11 and a heat treatment is then performed. Next, an alignment direction is imparted to the polyimide alignment layer via a rubbing process whereby the surface of the polyimide layer is rubbed with a rubbing cloth. Accordingly, the rubbing process generates substantially straight alignment grooves on the surface of the polyimide alignment layer along a predetermined alignment direction. Next, the base substrates 11 are bonded together by a sealant provided at a periphery of the active regions 13 of the unit panels 12, wherein the sealant includes the liquid crystal injection inlet. Subsequently, the bonded unit panels 12 are separated from each other, liquid crystal material is injected through the liquid crystal injection inlet and into the cell gap between the TFT array and color filter substrates, and the liquid crystal injection inlet is sealed. Polarizing plates are formed on external surfaces of the bonded TFT array and color filter substrates and periphery circuits for driving the LCD panel are provided in the pad regions, thereby completing the assembly of the related art LCD panel.

FIG. 3 illustrates a plurality of unit panels in one base substrate and FIG. 4 illustrates a mask used to form the unit panels shown in FIG. 3.

Referring to FIG. 3, four unit panels 12, having the same size, are formed within a base substrate 11 and are spaced apart from each other by predetermined distances. When an intended size of the unit panels 12 is smaller than an actual size of the mask 16 shown in FIG. 4, the unit panels 12 may be designed by the mask 16. Accordingly, unit panels 12 may be formed within the substrate 11 by applying various process steps to portions of the base substrate 11 exposed by the mask 16, wherein the mask is relocated over the base substrate 11 four times. When, however, the intended size of the unit panels 12 is larger than the actual size of the mask 16, the unit panels 12 cannot be designed using the mask 16. Accordingly, unit panels 12 having a size larger than a size of a mask cannot be designed and large-sized LCD panels cannot effectively be designed. In order to overcome the problem, the size of the unit panels 12 must designed according to the size restrictions introduced by the mask 16.

As mentioned above, LCD devices are being used in applications requiring LCD panels of diverse sizes. Generally, the size to which an LCD panel is fabricated depends upon the size of the apparatus fabricating the LCD panel. Moreover, it is generally difficult to fabricate LCD panels of varying size in one fabrication processing line. Further, providing a plurality of fabrication processing lines, each suited to fabricate LCD panel of a particular size are not feasible as apparatuses used to fabricate LCD panels tend to be expensive and take up large amounts of space.

To minimize the aforementioned problems, a plurality of unit panels 12, each having the same size, may be formed within a base substrate 11, wherein the size of each unit panel 12 is one-half, one-third, one-quarter, or even substantially the same size of the size of the base substrate 11. However, when the size of one unit panel within a base substrate is a large-sized panel (e.g., having dimensions of at least 30 inches), other large-sized unit panels cannot be formed within the remaining portions of the base substrate. Accordingly, the efficiency with which the base substrate is used becomes reduced and the price of fabricating LCD panels increases.

SUMMARY OF THE INVENTION

Accordingly, the present invention is directed to a method for designing a mask and for fabricating a unit panel that substantially obviates one or more problems due to limitations and disadvantages of the related art.

An advantage of the present invention provides a method for designing a mask and for fabricating a unit panel capable of maximizing the efficiency with which a base substrate is used.

Another advantage of the present invention provides a method for fabricating a plurality unit panels within a base substrate, wherein the plurality of unit panels are not formed to the same size.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method for designing a mask may, for example, include providing a mask to be applied to a base substrate, wherein the mask is divided into a first region and a second region; designing a first mask pattern for forming at least one first unit panel within the first region; and designing a second mask pattern for forming at least one second unit panel within the second region.

In one aspect of the present invention, the first mask pattern may comprise a repeat region and a non-repeat region.

In another aspect of the present invention, the size of the first region may be substantially the same as the size of the second region.

In another aspect of the present invention, the size of the first region may be larger or smaller than the size of the second region.

In still another aspect of the present invention, the at least one first unit panel may comprise a plurality of first unit panels.

In still another aspect of the present invention, the at least one second unit panel may comprise a plurality of second unit panels.

A method of fabricating a unit panel may, for example, include dividing a base substrate into a first region and a second region; forming at least one first unit panel having a first size within the first region; and forming at least one second unit panel having a second size within the second region.

In one aspect of the present invention, an alignment direction imparted to the at least one first and second unit panels may be substantially the same.

In another aspect of the present invention, an alignment direction imparted to any of the at least one first and second unit panels may be different.

In another aspect of the present invention, the at least one first unit panel includes a plurality of first unit panels.

In still another aspect of the present invention, the plurality of first unit panels may be formed by repeating the formation of the at the least first one unit panel within the first region.

In still another aspect of the present invention, the at least one second unit panel includes a plurality of second unit panels.

In still another aspect of the present invention, the plurality of second unit panels may be formed by repeating the formation of the at the least one second unit panel within the first region.

In yet another aspect of the present invention, the at least one first unit panel may be oriented at about 0°, 90°, 180°, or 270°, or any angle therebetween, with respect to the at least one second unit panel.

In still another aspect of the present invention, an alignment direction may be imparted to any of the at least one first and second unit panels via a physical alignment process (e.g., a rubbing process) or via a photo alignment process (e.g., a UV exposure process).

In yet another aspect of the present invention, the first and second unit panels within the base substrate may be used to form LCD panels of like liquid crystal modes or of different liquid crystal modes (e.g., VA, IPS, TN, STN, and the like).

In a further aspect of the present invention, the first and second unit panels within the same base substrate may used to form LCD panels having the substantially the same color reproduction ratios.

In yet another aspect of the present invention, the first size is larger or smaller than the second size.

In still another aspect of the present invention, a method for fabricating the unit panel may further include designating a plurality of areas for inspection of the first and second unit panels as coordinates; scanning an entirety of the first and second unit panels; and inspecting the plurality of areas designated as coordinates.

In yet another aspect of the present invention, a pitch of the first unit panel may be different from a pitch of the second unit panel.

A method for fabricating a unit panel may, for example, include providing a mask, wherein the mask includes a first region and a second region, wherein the first region may include a repeat region and a non-repeat region, wherein the second region is smaller than the first region and includes the portions of the mask not included within the first region; and forming at least one first unit panel and at least one second unit panel on a base substrate using the mask.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
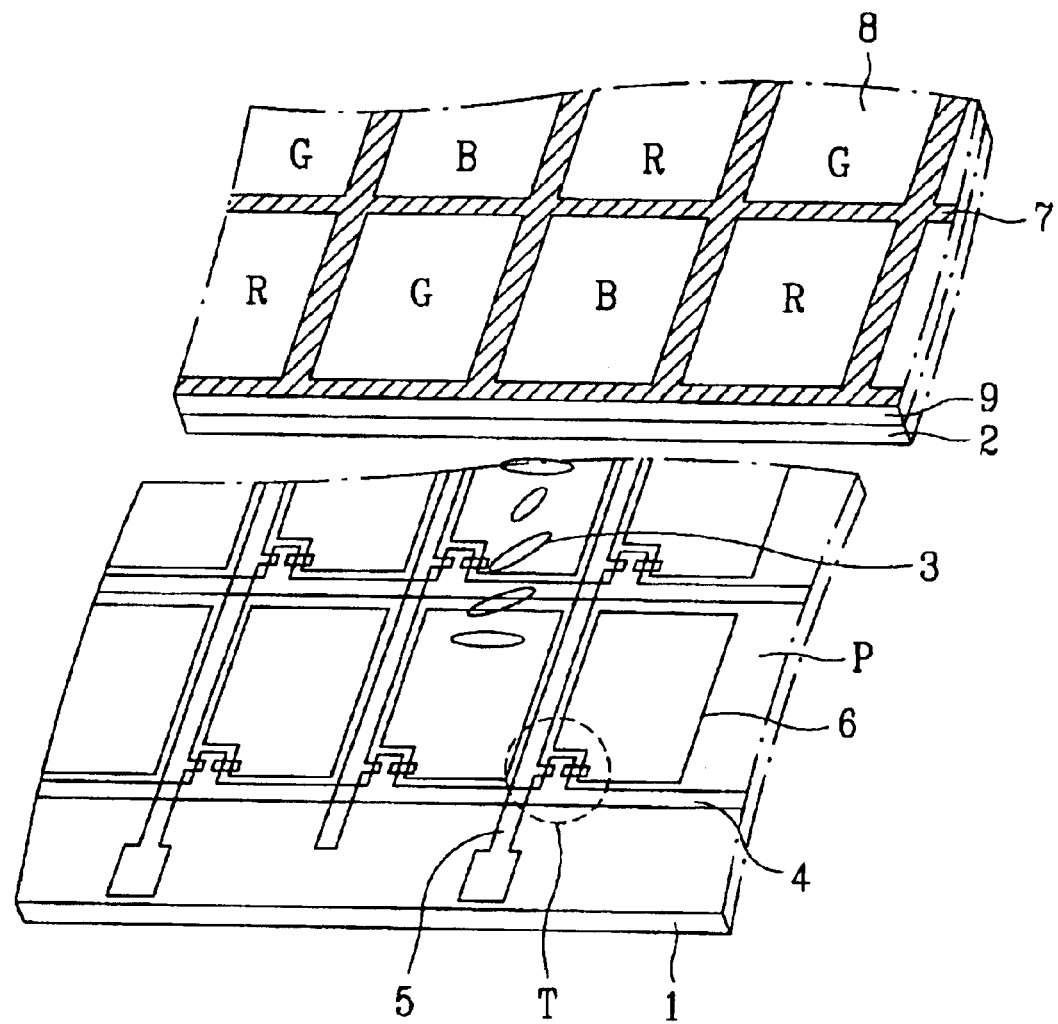
FIG. 1 illustrates a perspective view of a related art LCD panel of a color LCD device.
Figure 2:
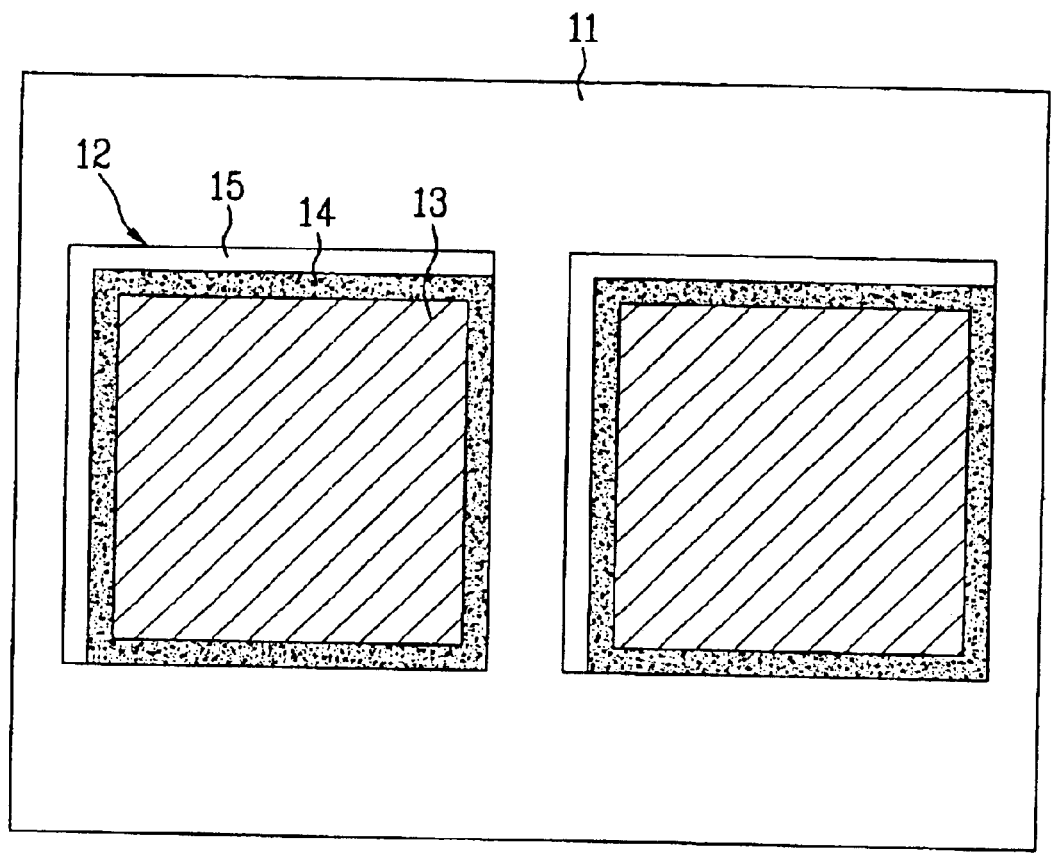
FIG. 2 illustrates the fabrication of a plurality of related art unit panels of the same size in one base substrate.
Figure 3:
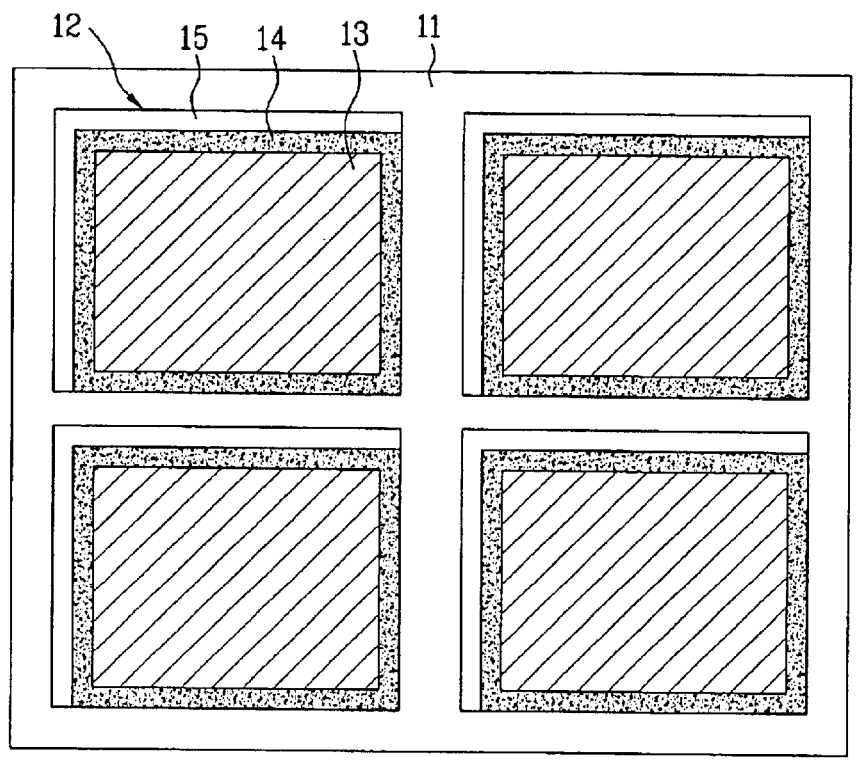
FIG. 3 illustrates a plurality of related art unit panels having the same size formed within the same base substrate.
Figure 4:
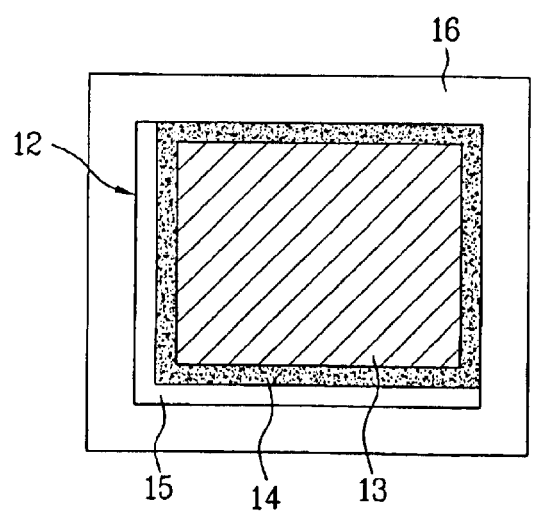
FIG. 4 illustrates a related art mask used in forming the unit panels shown in FIG. 3.
Figure 5A:
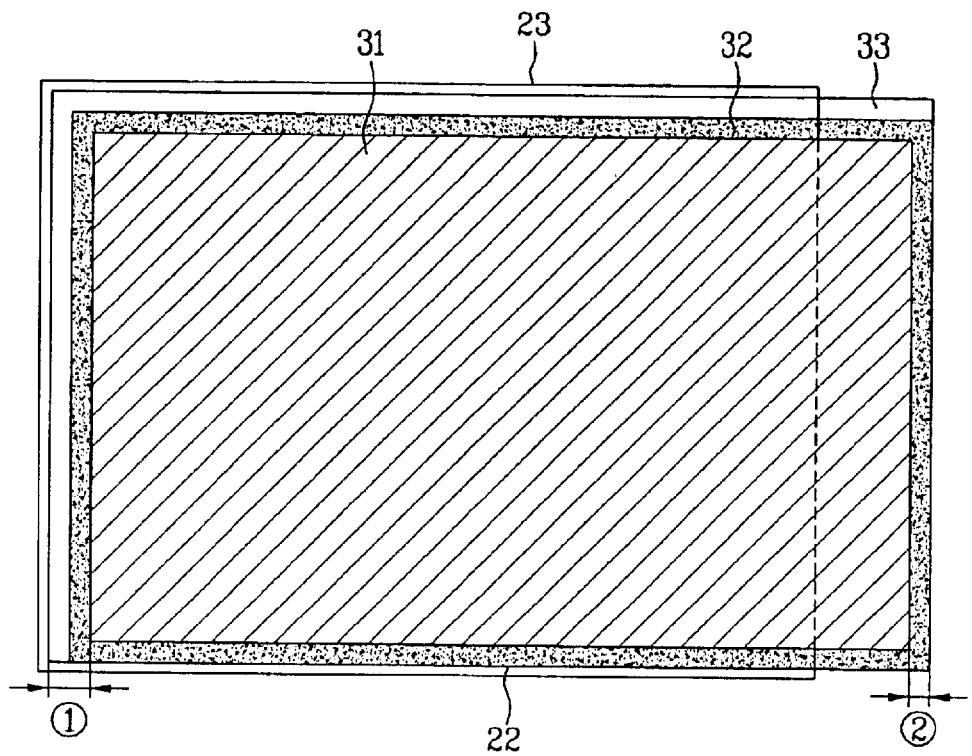
FIG. 5A illustrates a plan view of large-sized unit panel of a liquid crystal display device (LCD) according to the present invention.
Figure 5B:
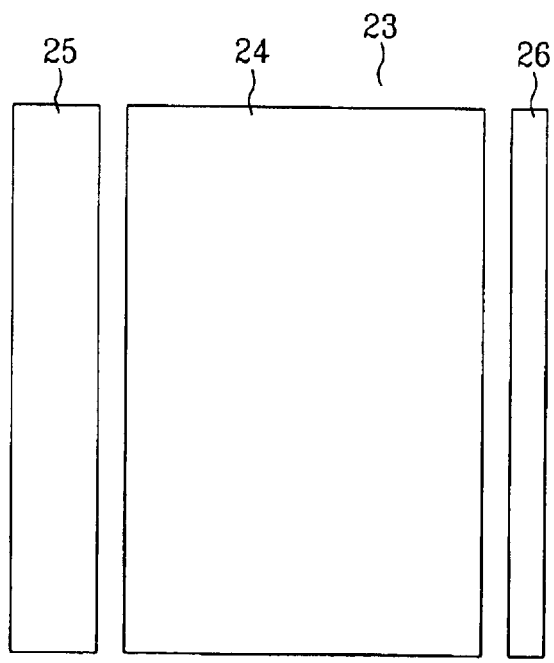
FIG. 5B is a plan view illustrating a method for designing a mask for forming a large-sized panel of FIG. 5A.
Figure 5C:
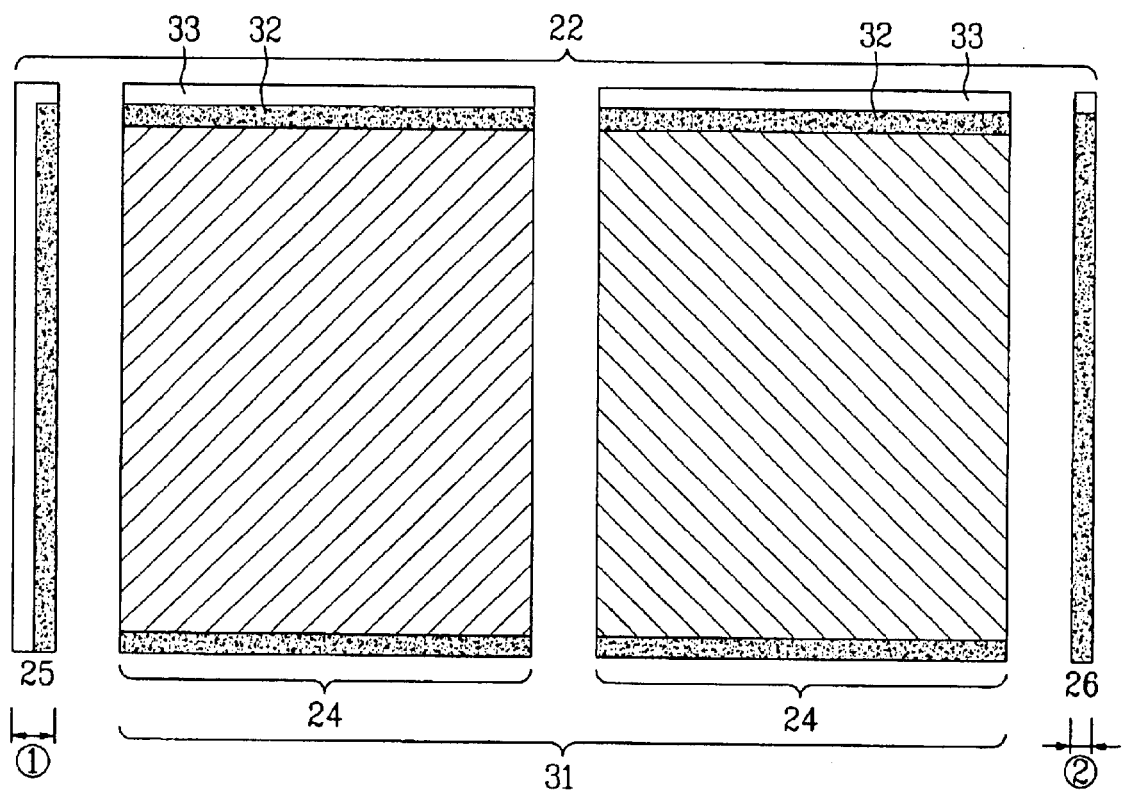
FIG. 5C is a plan view illustrating a method for designing a large-sized panel of FIG. 5A with a mask of FIG. 5B.

FIG. 5A illustrates a plan view of a large-sized unit panel of a liquid crystal display device (LCD) according to the present invention. FIG. 5B illustrates a plan view a method for designing a mask so as to form a large-sized panel shown in FIG. 5A. FIG. 5C illustrates the fabrication of the large-sized panel shown in FIG. 5A using the mask shown in FIG. 5B.

Referring to FIG. 5A, and as mentioned above, it is impossible to fabricate large-sized LCD panels with a single mask 23 when large-sized unit panels 22 (e.g., TFT array or color filter substrates) used to form the large-sized LCD panels (e.g., unit panels having a dimension of at least 30 inches) are larger than the mask 23.

Therefore, as shown in FIG. 5B, when the size of the large-sized unit panel 22 exceeds the size of the mask 23, the mask 23 may be divided into a plurality of portions. Accordingly, the mask 23, divided into the plurality of portions may then be used to form the large-sized unit panel 22. For example, a center portion of the mask 23 may be provided as a repeat region 24 and first and second non-repeat regions 25 and 26, respectively, may be provided at left and right sides of the repeat region 24 of the mask 23, respectively.

Referring to FIG. 5C, the large-sized unit panel 22 may be formed within a base substrate (not shown) using the first non-repeat region 25, the repeat region 24 twice, and the second non-repeat region 26. In one aspect of the present invention, use of the repeat region 24 may be repeated any number of times as required depending on the size of the repeat region 24 and the size of the unit panel to be formed.

In one aspect of the present invention, the first non-repeat region 25 of the mask 23 may be arranged over a region of the base substrate corresponding to a region to be occupied by a first portion of a black-matrix region 32 and a first portion of a pad region 33 (e.g., the region defined by region ① of FIG. 5A). In another aspect of the present invention, the second non-repeat region 26 of the mask 23 may be arranged over a region of the base substrate corresponding to a region to be occupied by a second portion of the black-matrix region 32 (e.g., the region defined by region ② of FIG. 5A). In still another aspect of the present invention, the repeat region 24 of the mask 23 may be repeatedly arranged over portions of the base substrate corresponding to a region to occupied by a active region 31.

In one aspect of the present invention, when fabricating the large-sized unit panel 22 using the mask 23 shown in FIG. 5B, various regions of the large-sized unit panel 22 (e.g., region ①, region ②, the active region 31, etc.) may be aligned with alignment keys on corresponding portions of the mask 23 (e.g., first non-repeat region 25, second non-repeat region 26, repeat region 24, etc.) between various processing steps used to form the large-sized unit panel 22. Referring to FIG. 5C, for example, the position of the of the first non-repeat region 25 may substantially correspond to the first portion of the pad region 33 and black-matrix region 32 in region ①; the positions of the repeatedly arranged repeat region 24 may correspond to adjacent areas of the active region 31, and the position of the second non-repeat region 26 may substantially correspond to the second portion of the black-matrix region 32 in region ②. In another aspect of the present invention, the large-sized unit panel 22 may be alternatively defined by the first portion of the pad region 33 in region ① and an edge of the active region 31 opposing region ① when the large-sized unit panel 22 does not include the second portion of the black-matrix region 32.

In one aspect of the present invention, and as will be discussed in greater detail below with respect to FIGS. 6A, 6B, 7A, and 7B, the aforementioned mask 23 may facilitate the formation of at least one unit panel, smaller in size than the aforementioned large-sized unit panel 22, within regions of the base substrate not occupied by the aforementioned large-sized unit panel 22.

Figure 6A:
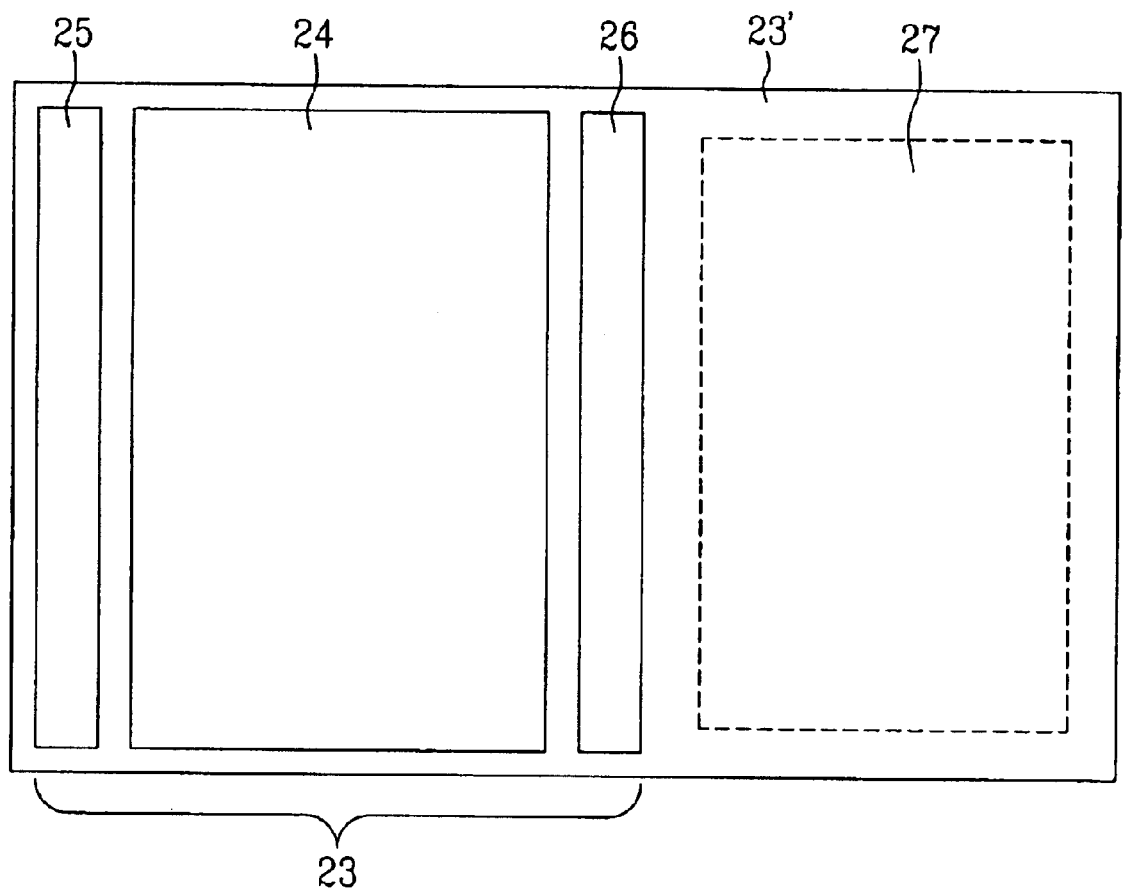
FIG. 6A and FIG. 6B are plan views illustrating a method for designing a mask of a liquid crystal display device (LCD) according to another embodiment of the present invention.
Figure 6B:
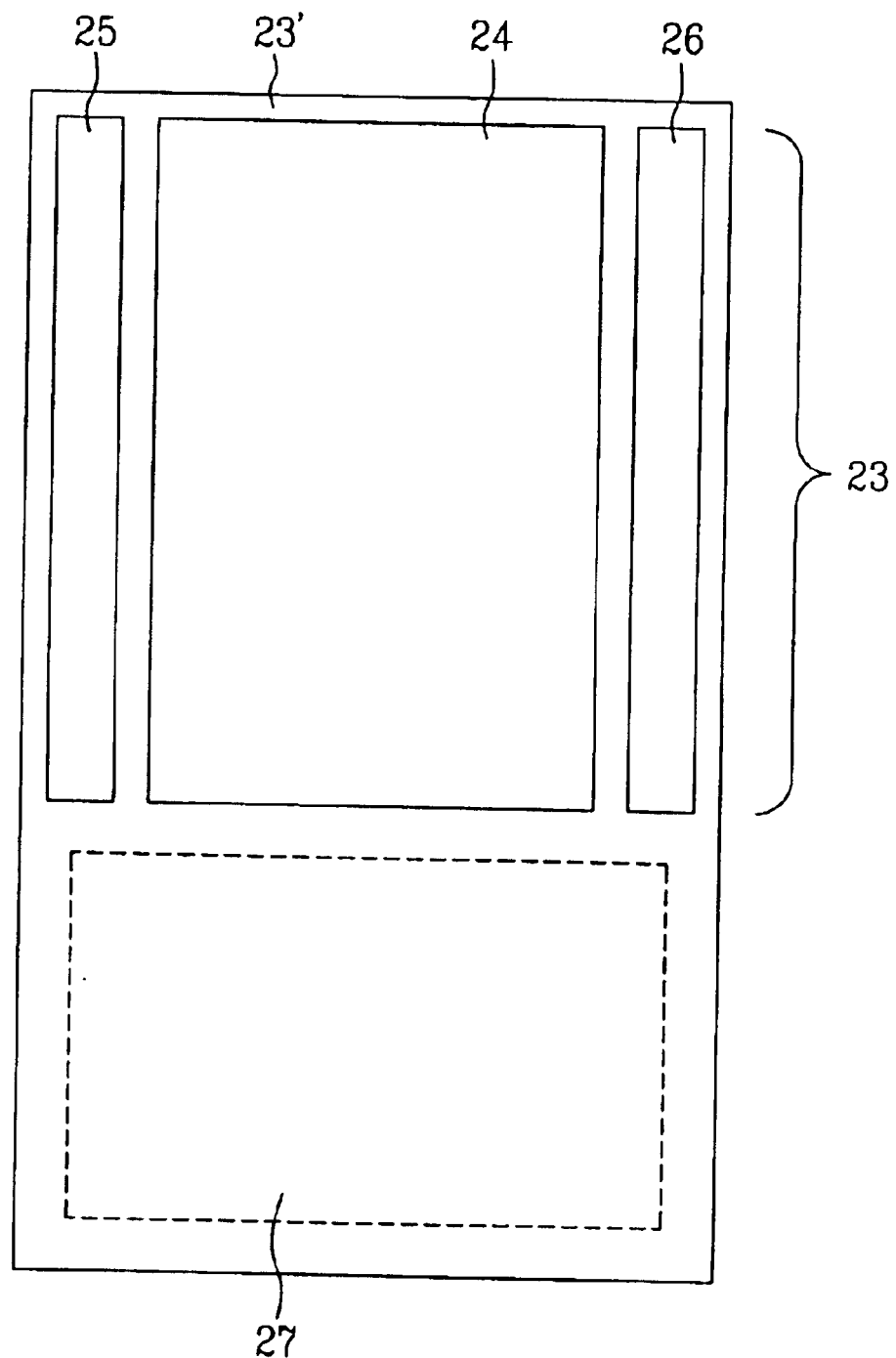

FIGS. 6A and 6B illustrate plan views of a mask 23' capable of facilitating the simultaneous formation of unit panels within a base substrate according to one aspect of the present invention.

Referring to FIGS. 6A and 6B, mask 23' may be divided into first and second regions, wherein the first region includes a first mask pattern 23 for forming unit panels such as the aforementioned large-sized unit panel 22 (herein referred to as the first unit panel 22), and wherein the second region includes a second mask pattern 27 for forming at least one second unit panel, wherein the at least one second unit panel is smaller than the first unit panel 22. In one aspect of the present invention, the size of the first region may be substantially the same as the size of the second region. In another aspect of the present invention, the size of the first region may be larger or smaller than the size of the second region. Accordingly, the first mask pattern 23 used in formation of the first unit panel 22 may be included within mask 23' even when the first unit panel 22 is larger than mask 23'. By providing mask 23' with the first and second regions, the efficiency with which a base substrate is used in the formation of unit panels may be maximized.

According to the principles of the present invention, the size of the mask 23' may be proportional to a vertical or horizontal dimension of the first unit panel 22. In one aspect of the present invention, the first mask pattern 23 may include the aforementioned repeat region 24 and the non-repeat regions 25 and 26 as described with respect to FIGS. 5A–5C for use in forming the first unit panel 22. Accordingly, the repeat and non-repeat regions of the first mask pattern 23 may be divided and arranged within first region of the mask 23'. In one aspect of the present invention, the first and second non-repeat regions 25 and 26 may be arranged at opposing sides of the repeat region 24 of the first mask pattern 23. In another aspect of the present invention, the first region may be arranged at a first side portion of the mask 23' (as shown in FIG. 6A), at an upper portion of the mask 23' (as shown in FIG. 6B), etc. Further, the second mask pattern 27 may be arranged within the second region of the mask 23, wherein the second region includes the remaining areas of the mask 23' not occupied by the first mask pattern 23. In one aspect of the present invention, the second region may be arranged at a second side portion of the mask 23' adjacent the first side portion (as shown in FIG. 6A), at a lower portion of the mask 23' adjacent the first side portion (as shown in FIG. 6B), etc.

In one aspect of the present invention, the size and alignment direction of the at least one second unit panel may be different from the size and/or alignment direction of the first unit panel 22.

According to the principles of the present invention, as the angle between a user's eye and a display surface of an LCD panel changes, the nature and quality of an image displayed by the LCD panel, viewable by the user, changes due to birefringence characteristics of liquid crystal material within the LCD panel. As defined in the present invention, a main viewing angle may be defined as the viewing angle between obtained when the brightest, clearest image is viewable from the LCD panel. Accordingly, and in one aspect of the present invention, the main viewing angle of the at least one second unit panel may be different from the main viewing angle of the first unit panel 22.

Further, the alignment process used to impart an alignment direction to the at least one second unit panel may be different than the process used to impart the alignment direction to the first unit panel 22.

According to the principles of the present invention, an alignment direction may be imparted to any of the first and second unit panels by via a physical alignment process (e.g., a rubbing process) or via a photo alignment process (e.g., a UV exposure process). When, for example, a rubbing process is used to impart an alignment direction to a unit panel, substantially straight alignment grooves may be formed on a surface of the unit panel, wherein the direction of the alignment grooves is determined by a rubbing direction of the rubbing process. Complementary ones of unit panels (e.g., TFT array and color filter substrates of an LCD panel) may be formed to have complementary (e.g., different or same) alignment directions. After complementary ones of the unit panels are formed within their respective base substrates, they may be bonded together to form the LCD panel. Upon bonding of the complementary substrates, the main viewing angle of the LCD panel is fixed.

Figure 7A:
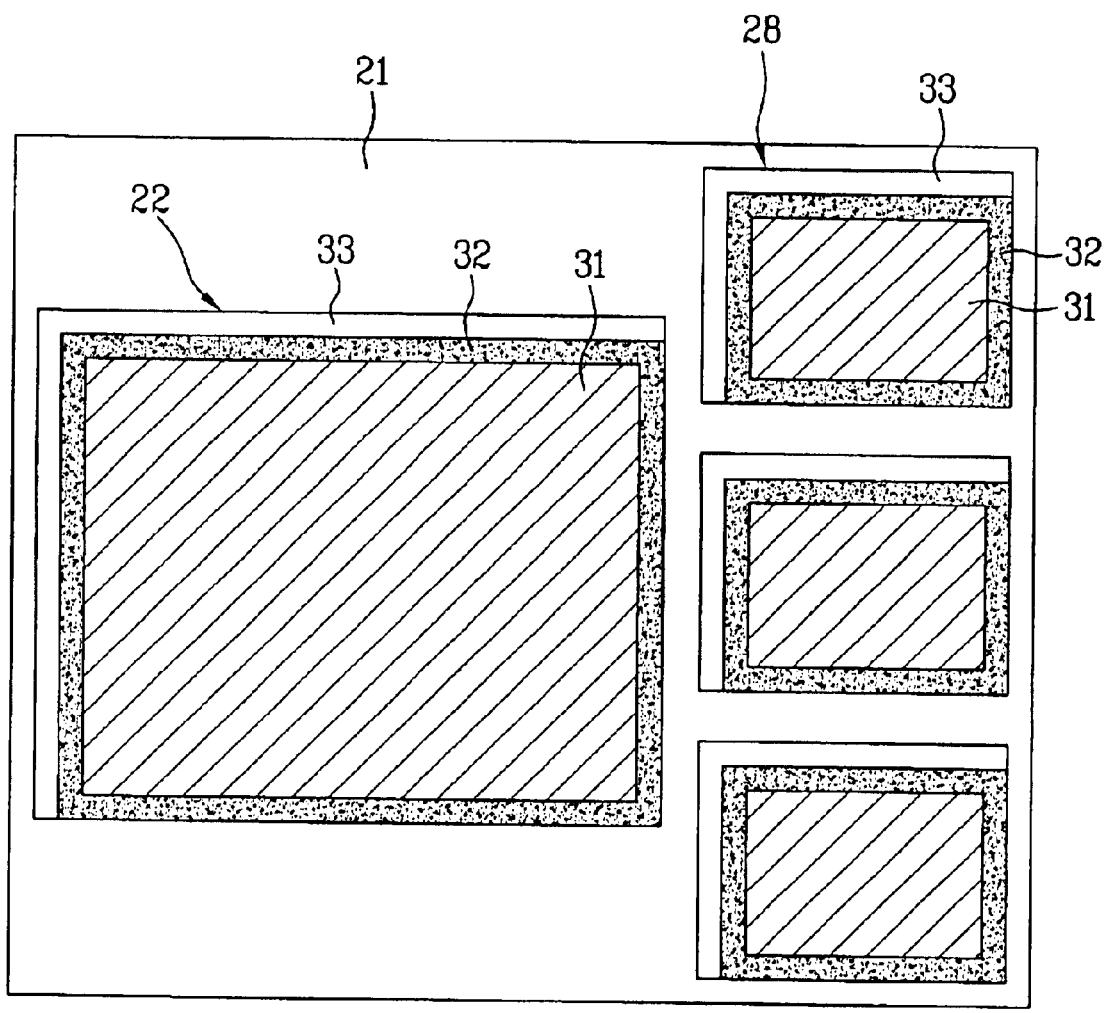
FIG. 7A and FIG. 7B are plan views illustrating a method for designing panels having various sizes with a mask of FIG. 6A and FIG. 6B.
Figure 7B:
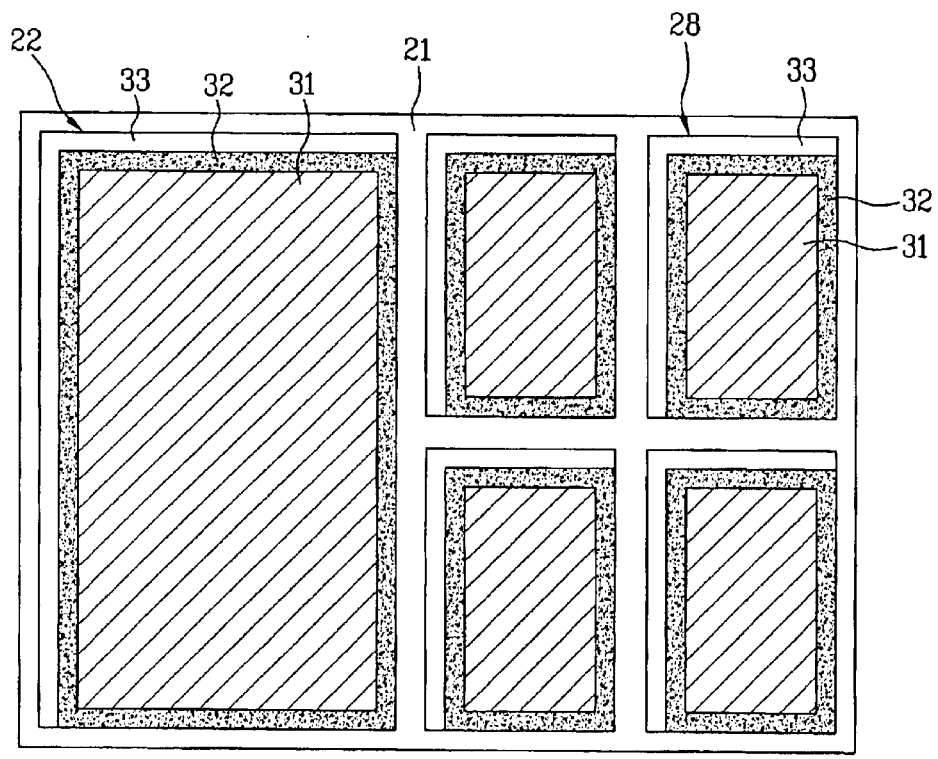

FIGS. 7A and 7B illustrate plan views of unit panels fabricated using the first and second mask patterns illustrated in FIGS. 6A and 6B, respectively.

Referring to FIGS. 7A and 7B, a plurality of unit panels of different sizes may be formed on a base substrate 21 using the mask 23' shown in FIGS. 6A and 6B, respectively. For example, a first unit panel 22 may be formed within the base substrate 21 using the aforementioned first mask pattern 23 and at least one second unit panel 28, smaller than the first unit panel 22, may be formed within regions of the base substrate 21 not occupied by the first unit panel 22 using the second mask pattern 27 (see FIGS. 6A and 6B). By forming a plurality of unit panels of different sizes within the same base substrate, the efficiency with which the base substrate 21 is used may be maximized. As shown in FIGS. 7A and 7B, the first and second unit panels 22 and 28, respectively, may be aligned with respect to each other at about 0° such that corresponding portions of the first and second unit panels may be similarly oriented within the base substrate 21.

According to the principles of the present invention, the liquid crystal mode, main viewing angle, alignment direction, method by which the alignment direction is obtained, and color reproduction ratio of LCD panels to be formed from complementary ones of the unit panels should be considered when forming the first and second unit panels within the base substrate 21. For example, while the unit panels of different sizes may be formed within the same base substrate 21, alignment directions of individual ones of the unit panels 22 and 28 may be the same or different.

In one aspect of the present invention, the first and second unit panels 22 and 28, respectively, may have alignment directions that are substantially parallel to each other (i.e., an alignment direction of the first unit panel 22 is aligned at substantially 0° or 180° with respect to an alignment direction of the second unit panels 28). Accordingly, the substantially parallel alignment direction may be provided to the first and second unit panels in the same alignment process via, for example, a physical alignment process (e.g., a rubbing process). During the rubbing process, the base substrate 21 is rubbed with cloth attached to a rotating drum and substantially straight alignment grooves are formed within the first and second unit panels. The direction that the alignment grooves extend, and thus the alignment direction, depends upon the orientation of the cloth contacting the base substrate 21 during the rubbing.

According to the principles of the present invention, main viewing angles of LCD panels vary depending upon the particular application LCD panels are used in. Further, main view angles of LCD panels depend upon the alignment directions of their constituent complementary unit panels as alignment directions of complementary unit panels influence the orientation characteristics of liquid crystal material within the LCD panels. LCD panels formed including unit panels such as those illustrated in FIGS. 7A and 7B may have desirable viewing angles because alignment directions of the complementary unit panels, formed within different base substrates, may substantially complement each other (e.g., the alignment direction of a unit panel formed in one base substrate may complement the alignment direction of a complementary unit panel formed in another base substrate). In one aspect of the present invention, main viewing angles of LCD panels may be adjusted by adjusting the alignment directions of the complementary unit panels forming the LCD panel.

Figure 8:
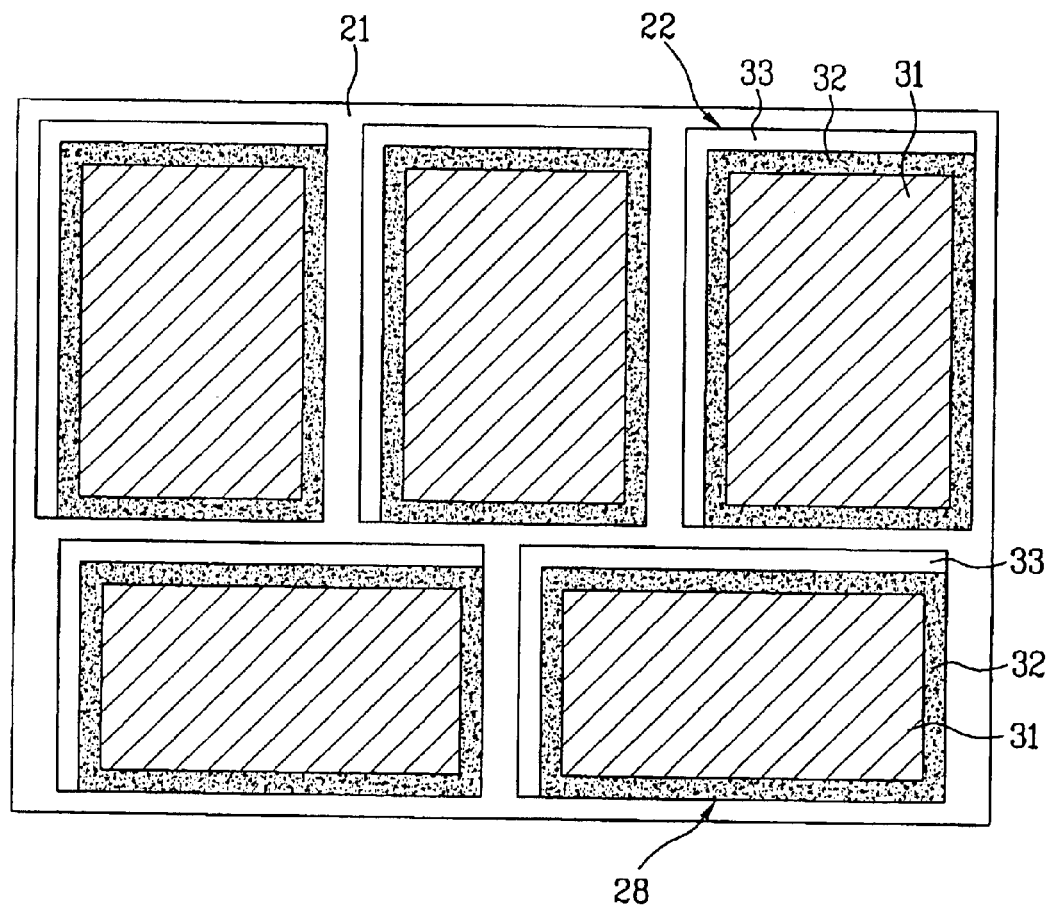
FIG. 8 is a plan view illustrating a method for designing panels having various sizes in a liquid crystal display device according to the present invention.

FIG. 8 illustrates a plan view of unit panels formed within a base substrate according to the principles of the present invention.

Referring to FIG. 8, a plurality of unit panels of different sizes may be formed on a base substrate 21 using a mask (not shown) similar to the mask 23' shown in FIGS. 6A and 6B, respectively. In one aspect of the present invention, however, more than one first unit panel 22 may be formed within the base substrate 21 using a mask pattern provided in the first region of the mask while a plurality of second unit panels 28, smaller than the first unit panel 22, may be formed within regions of the base substrate 21 not occupied by the first unit panel 22 using a mask pattern provided in the second region of the mask.

As mentioned above with respect to FIGS. 7A and 7B, the first and second unit panels 22 and 28, respectively, may be oriented with respect to each other at about 0° such that corresponding portions of the first and second unit panels may be similarly oriented within the base substrate 21. Accordingly, a substantially parallel alignment direction may be provided to each of the first and second unit panels 22 and 28 by the aforementioned physical alignment method.

As shown in FIG. 8, however, the first unit panels 22 may be aligned at angles other than 0° (e.g., 90°, 180°, 270°, or any other angle therebetween) with respect to the second unit panels 28. Formed via the aforementioned physical alignment process, LCD panels including the unit panels shown in FIG. 8 as constituent complementary unit panels, however, may have undesirable viewing angles because alignment directions of the complementary unit panels, formed within different base substrates, may not properly complement each other (e.g., the alignment direction of a unit panel formed in one base substrate may not properly compliment the alignment direction of a complementary unit panel formed in another base substrate). Further, when first and second unit panels 22 and 28 formed within a single base substrate 21 are required to have different alignment directions, use of the aforementioned physical alignment process can become problematic.

Accordingly, to overcome the aforementioned problems, the orientation characteristics of liquid crystal material to be provided within LCD panels may be influenced by means other than the aforementioned physical alignment process. In one aspect of the present invention, orientation characteristics of liquid crystal material may be influenced according to alignment directions provided via a photo alignment process (e.g., UV exposure process). In another aspect of the present invention, orientation characteristics of liquid crystal material may be influenced by forming the first and second unit panels 22 and 28 as constituent unit panels of VA mode LCD panels, capable of ensuring wide main viewing angles without employing the aforementioned alignment processes.

In performing the aforementioned photo alignment process, a desirable main viewing angle in an LCD panel may be obtained because alignment grooves are not formed using a rotating drum to contact the entire surface of the base substrate. In applying the photo alignment process, the surface of a unit panel may be selectively and uniformly exposed to polarized UV light via a lens and polarizer. Moreover, the UV light may be irradiated onto the surface of the unit panel at a predetermined angle. Accordingly, substantially straight alignment grooves may be formed only on portions of the substrate that were irradiated by the UV light (e.g., only portions of the base substrate corresponding to individual unit panels). Accordingly, alignment grooves extending along a first predetermined direction may formed on first predetermined ones of unit panels by selectively irradiating first predetermined ones of unit panels within the base substrate while the base substrate is oriented in a first orientation. Subsequently, alignment grooves extending along a second predetermined direction may be selectively formed on second predetermined ones of unit panels by selectively irradiating the second ones of predetermined unit panels within the base substrate while the base substrate is oriented in a second orientation. It will be appreciated that the principles of the present invention may be used to form alignment grooves extending in any number of directions, wherein different unit panels may have different alignment directions, and wherein individual unit panels may include more than one alignment direction. Accordingly, by forming the first and second unit panels 22 and 28 via photo alignment process, LCD panels having desirable viewing angles may be obtained even when unit panels 22 and 28 are formed within the base substrate at angles other than 0° with respect to each other.

TN mode LCD panels generally include a layer of liquid crystal material having molecules with longitudinal directions that are substantially parallel with interior surfaces of complementary unit panels (e.g., TFT array and color filter substrates) when a voltage is not applied to the LCD panel. Using any of the aforementioned alignment processes, a pretilt angle may be induced within the liquid crystal molecules. Upon the application of a voltage to the LCD panel, the longitudinal directions of the liquid crystal molecules become substantially perpendicular with the surface of the unit panels. In VA mode LCD panels, however, a protrusion and a slit may be formed on constituent unit panels to generate fringe electric fields. Accordingly, the fringe electric fields may induce liquid crystal domains within a single pixel region that maximize a main viewing angle without requiring use of any of the aforementioned alignment processes.

In forming the aforementioned unit panels 22 and 28 as constituent unit panels of VA mode LCD panels, longitudinal directions of liquid crystal molecules within VA mode LCD panels may be substantially perpendicular to the interior surface of the complementary unit panels when a voltage is not applied to the LCD panel and when the liquid crystal material has a negative dielectric anisotropy. Accordingly, when the voltage is not applied to the LCD panel, voltage is not applied to the protrusion and liquid crystal molecules become substantially vertically aligned to a slope of the protrusion on the unit panel since the liquid crystal molecules have tilt components. When voltage is applied to the protrusion, different domains of different liquid crystal orientation changes are induced within the layer of liquid crystal in accordance with a boundary region between the protrusion and the slit. Accordingly, by forming the first and second unit panels 22 and 28 as constituent unit panels of VA mode LCD panels, an LCD panel having desirable viewing angles may be obtained even when unit panels 22 and 28 are formed within the base substrate at angles other than 0° with respect to each other.

In one aspect of the present invention, fabrication of unit panels may be facilitated by forming unit panels intended to be constituent complementary unit panels within LCD panels of a single liquid crystal mode (e.g., TN, STN, IPS, VA, etc.) within the same base substrate. For example, TN mode LCD panels may include constituent complementary unit panels that were all formed in the same base substrate and were all formed using the same processes. Accordingly, unit panels having different sizes and/or alignment directions (e.g., alignment grooves extending along different directions), and intended to be constituent complementary unit panels within LCD panels of a single liquid crystal mode may be formed within the same base substrate. In another aspect of the present invention, however, unit panels intended to be formed in LCD panels of different liquid crystal modes may also be formed within the same base substrate. For example, a unit panel intended to be a constituent unit panel of a IPS mode LCD panel may be formed within the same base substrate as a unit panel intended to be a constituent unit panel of a STN mode LCD panel is formed within. In yet another aspect of the present invention, unit panels intended to be formed within LCD panels having the substantially same or similar color reproduction ratio may be formed within the same base substrate.

As described above, a plurality of unit panels of the same or different size, and having the same or different alignment directions, may be formed within a single base substrate. Accordingly, the efficiency with which a base substrate is used may be maximized. Further, the unit panels within the base substrate may be aligned at substantially any angle with respect to each other. Further, formation of the first and/or second unit panels 22 and/or 28, respectively, may be repeated within the first and/or second respective regions of the base substrate, respectively. Still further, the unit panels may be symmetrically or asymmetrically arranged about an axis of the base substrate. In one aspect of the present invention, the symmetrical arrangement of the unit panels may facilitate photo alignment, physical alignment, inspecting, and other processes used in forming the unit panels (e.g., the TFT array and/or color filter substrates). In one aspect of the present invention, the photo alignment method may employ a mask having a size that is substantially equal to, or greater than, the size of the unit panel being exposed. In another aspect of the present invention, the size of the mask used in the photo alignment method may be smaller than the size of the unit panel and may be used to repeatedly form unit panels for improving yield.

According to the principles of the present invention, an inspecting process may be performed to inspect the unit panels formed within the base substrate 21. In one aspect of the present invention, the unit panels may be inspected by designating one or more areas on the base substrate for inspection and assigning coordinates to the areas to be inspected. Accordingly, it may not be necessary for the unit panels to be symmetrically arranged within the base substrate 21 in order to perform the inspection process. In another aspect of the present invention, the unit panels may be repeatedly formed within the base substrate to facilitate the inspection process.

According to the principles of the present invention, an alignment direction may be provided to unit panels symmetrically arranged within a base substrate by, at least in part, printing an alignment layer made out of a material such as polyimide onto a surface of the unit panel. In one aspect of the present invention, alignment layers having sizes corresponding to the sizes of unit panels asymmetrically arranged within the base substrate may be applied to regions of the base substrate corresponding to particular unit panels. Thus, unit panels asymmetrically arranged within the base substrate may be repeatedly formed within the base substrate for improving yield. In one aspect of the present invention, alignment grooves may be formed by applying the aforementioned alignment processes to the alignment layer.

Upon inspecting the unit panels formed within the base substrate (e.g., the first unit panels, the second unit panels, or both), an area to be inspected may be assigned specific coordinates. In one aspect of the present invention, the assigned areas may be inspected. In another aspect of the present invention, the entire area of the base substrate may be scanned during the inspecting.

As described above, the principles of the present invention provide a single mask that is designed to allow unit panels of differing sizes to be formed within the same base substrate. However, in another aspect of the present invention, the at least one first unit panel 22 and the at least one second unit panel 28 may be formed using separated first and second masks, respectively. Accordingly, the aforementioned repeat region 24 and first and second non-repeat regions 25 and 26, respectively, may be included within the first mask while the second mask may be used to form the second unit panels.

FIGS. 9A to 9D illustrate views of a method of forming panels having different sizes according to the present invention.

Figure 9A:
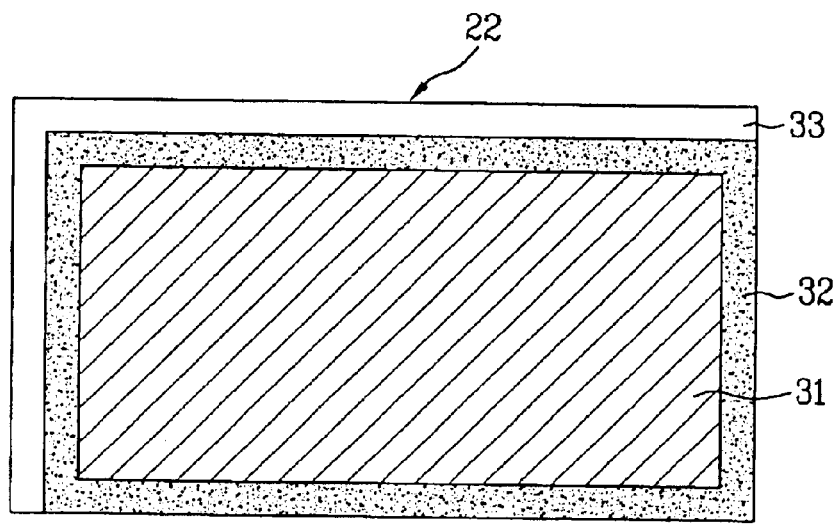
FIG. 9A to FIG. 9D are exemplary views illustrating a state of forming a plurality of panels having different sizes according to the present invention.
Figure 9B:
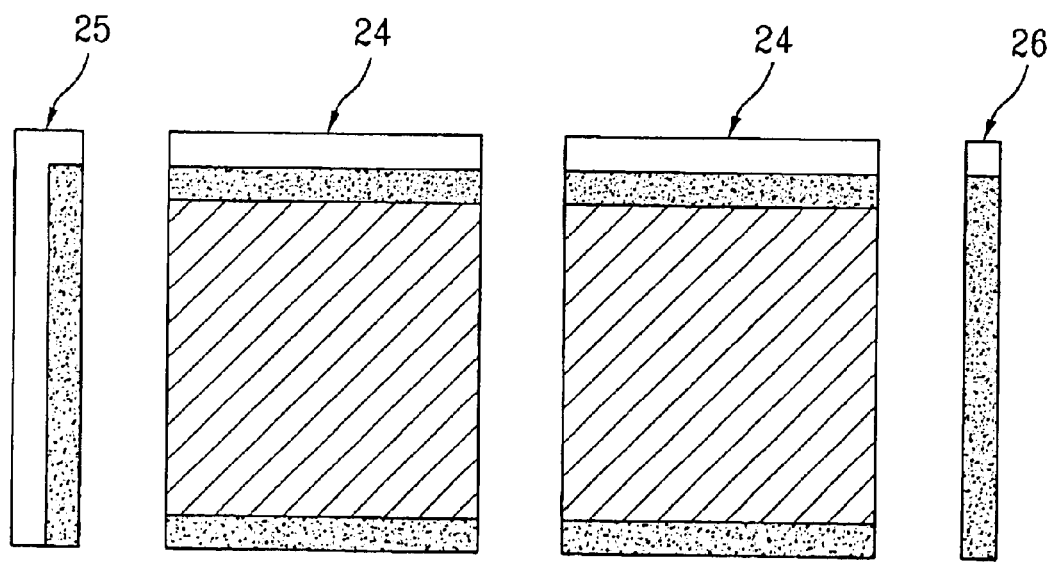
Figure 9C:
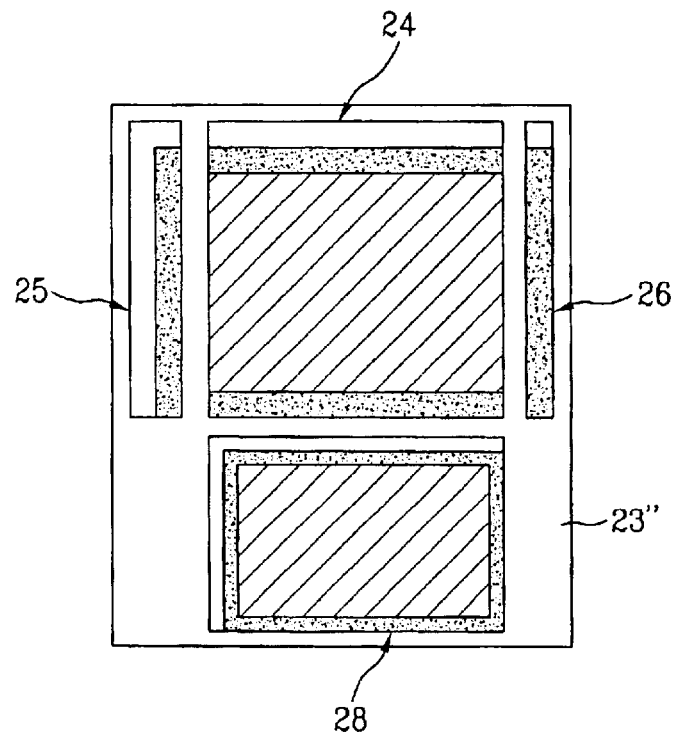

Referring to FIG. 9B, the first unit panel 22 shown in FIG. 9A (e.g., a unit panel such as the aforementioned large-size unit panel) may be conceptually divided into portions corresponding to a first non-repeat region 25, two adjacent repeat regions 24, and a second non-repeat region 26. Subsequently, as shown in FIG. 9C, a first mask pattern having mask regions used to form the conceptually divided portions of the first unit panel 22 may be arranged in a side portion or an upper portion of mask 23". Further, a second mask pattern 27 used to form at least one second unit panel 28 may be arranged within a remaining portion of the mask 23".

Figure 9D:
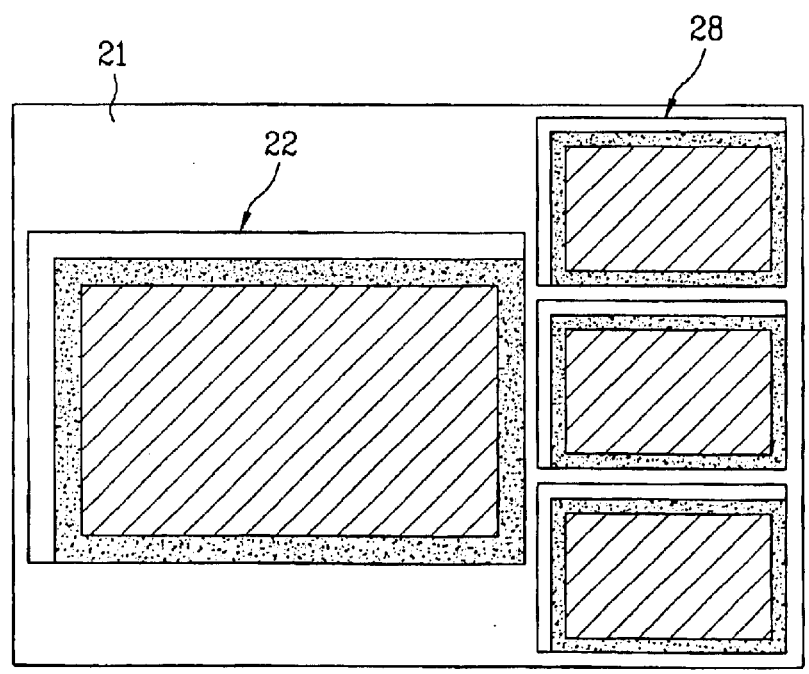

Referring to FIG. 9D, the first unit panel 22 and a plurality of second unit panels 28, smaller than the first unit panel 22 may be formed within the same base substrate 21 using the mask 23' designed as shown in FIG. 9C.

The method for designing a mask and of fabricating the unit panels according to the present invention is advantageous because a plurality of unit panels having different sizes may be formed on the same base substrate, thereby improving the efficiency with which the base substrate is used and reducing a manufacturing cost of LCD panels.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method fabricating a unit panel, comprising:
   providing a base substrate having a first region and a second region;
   forming at least one first unit panel of an LCD panel of a first size within the first region; and
   forming at least one second unit panel of an LCD panel of a second size within the second region, wherein the second size is different from the first size.

2. The method of claim 1, wherein the first region is larger than the second region.

3. The method of claim 1, wherein the first region is smaller than the second region.

4. The method of claim 1, wherein the first size is greater than the second size.

5. The method of claim 1, wherein the at least one first unit panel is oriented at about 0° with respect to the at least one second unit panel.

6. The method of claim 1, wherein the at least one first unit panel is oriented at about 90° with respect to the at least one second unit panel.

7. The method of claim 1, wherein the at least one first unit panel is oriented at about 180° with respect to the at least one second unit panel.

8. The method of claim 1, wherein the at least one first unit panel is oriented at about 270° with respect to the at least one second unit panel.

9. The method of claim 1, further comprising applying an alignment process to the at least one first unit panel.

10. The method of claim 9, wherein the alignment process includes a photo alignment process.

11. The method of claim 10, wherein the photo alignment process includes exposure to UV light.

12. The method of claim 1, further comprising applying an alignment process to the at least one second unit panel.

13. The method of claim 12, wherein the alignment process includes a photo alignment process.

14. The method of claim 13, wherein the photo alignment process includes exposure to UV light.

15. The method of claim 1, further comprising applying a physical alignment process to the at least one first unit panel and the at least one second unit panel.

16. The method of claim 15, wherein the physical alignment process includes a rubbing process.

17. The method of claim 1, further comprising:
   forming first alignment grooves in the at least one first unit panel; and
   forming second alignment grooves in the at least one second unit panel.

18. The method of claim 17, wherein the first and second alignment grooves are substantially parallel.

19. The method of claim 17, wherein the first alignment grooves are not substantially parallel to the second alignment grooves.

20. The method of claim 19, wherein the first alignment grooves are substantially perpendicular to the second alignment grooves.

21. The method of claim 17, wherein the alignment grooves of at least one of the at least one first unit panel and the at least one second unit panel are not parallel to alignment grooves of others of the at least one first and second unit panels.

22. The method of claim 1, wherein the at least one first unit panel and the at least one second unit panel are constituent unit panels of LCD panels of like liquid crystal mode.

23. The method of claim 1, wherein the at least one first unit panel and the at least one second unit panel are constituent unit panels of LCD panels of different liquid crystal modes.

24. The method of claim 1, wherein the at least one first unit panel is a constituent unit panel of a vertical alignment (VA) mode LCD panel.

25. The method of claim 1, wherein the at least one second unit panel is a constituent unit panel of a vertical alignment (VA) mode LCD panel.

26. The method of claim 1, wherein at least one of the at least one first unit panel and the at least one second unit panel is a constituent unit panel of an in-plane switching (IPS) mode LCD panel.

27. The method of claim 1, wherein at least one of the at least one first unit panel and the at least one second unit panel is a constituent unit panel of a twisted nematic (TN) mode LCD panel.

28. The method of claim 1, wherein at least one of the at least one first unit panel and the at least one second unit panel is a constituent unit panel of a super twisted nematic (STN) mode LCD panel.

29. The method of claim 1, wherein the at least one first unit panel and the at least one second unit panel are constituent unit panels of LCD panels having substantially the same color reproduction ratio.

30. The method of claim 1, wherein at least one of the at least one first unit panel and the at least one second unit panel is asymmetrically arranged within the base substrate.

31. The method of claim 1, wherein at least one of the at least one first unit panel and the at least one second unit panel is symmetrically arranged within the base substrate.

32. The method of claim 1, further comprising:
designating a plurality of areas of the base substrate for inspection of the at least one first and second unit panels as coordinates;
scanning an entirety of the at least one first and second unit panels; and
inspecting the plurality of areas designated coordinates.

33. The method of claim 1, wherein a pitch of the at least one first unit panel is different from a pitch of the at least one second unit panel.

34. A method for fabricating a unit panel of an LCD panel, comprising:
providing a mask having a first region and a second region, wherein the first region includes a first mask pattern and the second region includes a second mask pattern;
providing a base substrate; and
forming at least one first unit panel and at least one second unit panel on the base substrate using the first mask pattern and second mask pattern, respectively, wherein the at least one second unit panel is of a different size than the at least one first unit panel.

35. The method of claim 34, wherein the first mask pattern includes a repeat region and a non-repeat region.

36. The method of claim 34, wherein a size of the first region is substantially the same size of the second region.

37. The method of claim 34, wherein a size of the first region is greater than a size of the second region.

38. The method of claim 34, wherein a size of the first region is less than a size of the second region.

39. The method of claim 34, wherein the second region is arranged in portions of the mask not occupied by the first region.

40. The method of claim 34, wherein the at least one first unit panel is larger than the first mask pattern.

41. The method of claim 34, wherein the at least one first unit panel is larger than the at least one second unit panel.

42. The method of claim 34, wherein the at least one first unit panel is oriented at about 0° with respect to the at least one second unit panel.

43. The method of claim 34, wherein the at least one first unit panel is oriented at about 90° with respect to the at least one second unit panel.

44. The method of claim 34, wherein the at least one first unit panel is oriented at about 180° with respect to the at least one second unit panel.

45. The method of claim 34, wherein the at least one first unit panel is oriented at about 270° with respect to the at least one second unit panel.

46. The method of claim 34, further comprising applying an alignment process to the at least one first unit panel.

47. The method of claim 46, wherein the alignment process includes a photo alignment process.

48. The method of claim 47, wherein the photo alignment process includes exposure to UV light.

49. The method of claim 34, further comprising applying an alignment process to the at least one second unit panel.

50. The method of claim 49, wherein the alignment process includes a photo alignment process.

51. The method of claim 50, wherein the photo alignment process includes exposure to UV light.

52. The method of claim 34, further comprising applying a physical alignment process to the at least one first unit panel and the at least one second unit panel.

53. The method of claim 52, wherein the physical alignment process includes a rubbing process.

54. The method of claim 34, further comprising:
forming first alignment grooves in the at least one first unit panel; and
forming second alignment grooves in the at least one second unit panel.

55. The method of claim 54, wherein the first and second alignment grooves are substantially parallel.

56. The method of claim 54, wherein the first alignment grooves are not substantially parallel to the second alignment grooves.

57. The method of claim 56, wherein the first alignment grooves are substantially perpendicular to the second alignment grooves.

58. The method of claim 54, wherein the alignment grooves of at least one of the at least one first unit panel and the at least one second unit panel are not parallel to alignment grooves of others of the at least one first and second unit panels.

59. The method of claim 34, wherein the at least one first unit panel and the at least one second unit panel are constituent unit panels of LCD panels of like liquid crystal mode.

60. The method of claim 34, wherein the at least one first unit panel and the at least one second unit panel are constituent unit panels of LCD panels of different liquid crystal modes.

61. The method of claim 34, wherein the at least one first unit panel is a constituent unit panel of a vertical alignment (VA) mode LCD panel.

62. The method of claim 34, wherein the at least one second unit panel is a constituent unit panel of a vertical alignment (VA) mode LCD panel.

63. The method of claim 34, wherein at least one of the at least one first unit panel and the at least one second unit panel is a constituent unit panel of an in-plane switching (IPS) mode LCD panel.

64. The method of claim 34, wherein at least one of the at least one first unit panel and the at least one second unit panel is a constituent unit panel of a twisted nematic (TN) mode LCD panel.

65. The method of claim 34, wherein at least one of the at least one first unit panel and the at least one second unit panel is a constituent unit panel of a super twisted nematic (STN) mode LCD panel.

66. The method of claim 34, wherein the at least one first unit panel and the at least one second unit panel are constituent unit panels of LCD panels having substantially the same color reproduction ratio.

67. The method of claim 34, wherein at least one of the at least one first unit panel and the at least one second unit panel is asymmetrically arranged within the base substrate.

68. The method of claim 34, wherein at least one of the at least one first unit panel and the at least one second unit panel is symmetrically arranged within the base substrate.

* * * * *